US009953245B2

(12) United States Patent
Palacio et al.

(10) Patent No.: US 9,953,245 B2
(45) Date of Patent: *Apr. 24, 2018

(54) MULTI-CAMERA VEHICLE IDENTIFICATION SYSTEM

(71) Applicant: AGT INTERNATIONAL GMBH, Zurich (CH)

(72) Inventors: Sebastian Palacio, Kaiserslautern (DE); Stephan Krauss, Kaiserslautern (DE); Jan Hirzel, Kaiserslautern (DE); Didier Stricker, Kaiserslautern (DE); Markus Schlattmann, Griesheim (DE); Sebastian Hohmann, Bruchkoebel (DE)

(73) Assignee: AGT INTERNATIONAL GMBH, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,463

(22) Filed: Aug. 19, 2016

(65) Prior Publication Data

US 2017/0004386 A1 Jan. 5, 2017

Related U.S. Application Data

(63) Continuation of application No. 14/790,323, filed on Jul. 2, 2015, now Pat. No. 9,449,258.

(51) Int. Cl.
*G06K 9/00* (2006.01)
*G06K 9/62* (2006.01)
(Continued)

(52) U.S. Cl.
CPC ....... *G06K 9/6269* (2013.01); *G06K 9/00785* (2013.01); *G06K 9/325* (2013.01);
(Continued)

(58) Field of Classification Search
CPC ........ G06K 9/6256; G06K 9/325; G06K 9/46; G06K 9/6201; G06K 9/4652; G06K 9/52; H04N 7/181
(Continued)

(56) References Cited

U.S. PATENT DOCUMENTS 5,034,986 A 7/1991 Karmann
5,696,503 A 12/1997 Nasburg
(Continued)

FOREIGN PATENT DOCUMENTS

DE 4328939 A1 3/1995
DE 19738646 A1 3/1999
(Continued)

OTHER PUBLICATIONS

Bai, Computer vision techniques for traffic flow computation, Pattern Anal Applic, 2005, pp. 365-372, vol. 7.
(Continued)

*Primary Examiner* — Tom Y Lu
(74) *Attorney, Agent, or Firm* — Browdy and Neimark, PLLC

(57) ABSTRACT

A method and system of identifying in an image captured by a second camera a target object captured by a first camera is disclosed. The method comprises using image captured by the $1^{st}$ camera for generating a first set of objects comprising the target object and other objects; classifying each object to generate a reference group of attribute values characterizing the objects; using image captured by the $2^{nd}$ camera for generating second sets of objects; classifying each object in each second set to generate, for each second set, a corresponding group of attribute values characterizing the objects in the corresponding second set; selecting the second set of objects corresponding to the group of attribute values best matching the reference group of attribute values; and iden-
(Continued)

tifying the target object in the selected second set of objects in accordance with a position of the target object in the first set of objects.

18 Claims, 11 Drawing Sheets

(51) Int. Cl.
*H04N 7/18* (2006.01)
*G06K 9/32* (2006.01)
*H04N 5/247* (2006.01)
*G08G 1/015* (2006.01)
*G08G 1/017* (2006.01)
*G08G 1/04* (2006.01)

(52) U.S. Cl.
CPC ......... *G06K 9/6201* (2013.01); *G06K 9/6256* (2013.01); *G06K 9/6293* (2013.01); *G08G 1/015* (2013.01); *G08G 1/0175* (2013.01); *G08G 1/04* (2013.01); *H04N 5/247* (2013.01); *H04N 7/181* (2013.01); *G06K 2209/23* (2013.01)

(58) Field of Classification Search
USPC .................................................. 382/103, 105
See application file for complete search history.

(56) References Cited

U.S. PATENT DOCUMENTS

| | | | |
|---|---|---|---|
| 7,295,106 B1 | 11/2007 | Jackson et al. | |
| 7,587,064 B2 | 9/2009 | Owechko et al. | |
| 7,881,494 B2 | 2/2011 | Kitamura | |
| 7,965,867 B2 | 6/2011 | Lanz | |
| 8,009,863 B1 | 8/2011 | Sharma et al. | |
| 8,615,105 B1 | 12/2013 | Cheng et al. | |
| 8,836,788 B2 * | 9/2014 | Nerayoff ................ | H04N 7/181 348/148 |
| 2005/0012817 A1 | 1/2005 | Hampapur et al. | |
| 2008/0031493 A1 | 2/2008 | Brogen et al. | |
| 2009/0040301 A1 | 2/2009 | Sandler et al. | |
| 2009/0167942 A1 | 7/2009 | Hoogenstraaten et al. | |
| 2009/0296989 A1 | 12/2009 | Ramesh et al. | |
| 2014/0098221 A1 | 4/2014 | Brown et al. | |

FOREIGN PATENT DOCUMENTS

| | | |
|---|---|---|
| DE | 102009010812 A1 | 9/2010 |
| EP | 1489552 A1 | 12/2004 |
| WO | 2011120194 A1 | 10/2011 |
| WO | 2014072971 A1 | 5/2014 |

OTHER PUBLICATIONS

Kogut, et al., Maintaining the Identity of Multiple Vehicles as They Travel Through a Video Network, Multi-Object Tracking, 2001. Proceedings. 2001 IEEE Workshop on. IEEE, 2001, pp. 1-6.
Ramachandran, et al., A Pattern Recognition and Feature Fusion Formulation for Vehicle Reidentification in Intelligent Transportation Systems, Acoustics, Speech, and Signal Processing (ICASSP), 2002 IEEE International Conference on, 2002, pp. IV-3840-IV-3843, vol. 4.
Wang, et al., Wide-Area Multi-Object Tracking with Non-Overlapping Camera Views, 2011 IEEE International Conference on Multimedia and Expo (ICME), 2011, pp. 1-7.
Jang, D. M., et al "Car-Rec: A real time car recognition system". In applications of computer vision (WACV), 2011 IEEE Workshop on. 599-605 (Jan. 2011).
Lim, T. R., et al "Car recognition using Gabor filter feature extraction". In Circuits and Systems, 2002. APCCAS'02. 2002 Asia-Pacific Conference on. 2 : 451-455 (2002).
Schmid C. . "Selection of scale-invariant parts for object class recognition". In Computer Vision, 2003. Proceedings. Ninth IEEE International Conference on. 634-639 (Oct. 2003).
Swain, M. J., & Ballard, D. H. "Color indexing". International journal of computer vision, 7(1), 11-32. (1991).
Sun, C. C., et al "Vehicle Reidentification Using Multidetector Fusion". Intelligent Transportation Systems, IEEE Transactions on, 5(3), 155-164. (2004).
https://en.wikipedia.org/wiki/Kendall_tau_distance (Mar. 18, 2015).
https://en.wikipedia.org/wiki/List_of_atmospheric_dispersion_models (Mar. 18, 2015).
Coifman B. . "Vehicle Reidentification and Travel Measurements on Congested Freeways". California Partners for Advanced Transit and Highways (PATH). (1999).
Santos, D. J. A. "Automatic Vehicle Recognition System" Master's Dissertation Thesis, (Sep. 2008).
Santos, D. J. A. "Automatic Vehicle Recognition System" (Sep. 1, 2008).

* cited by examiner

Fig. 3
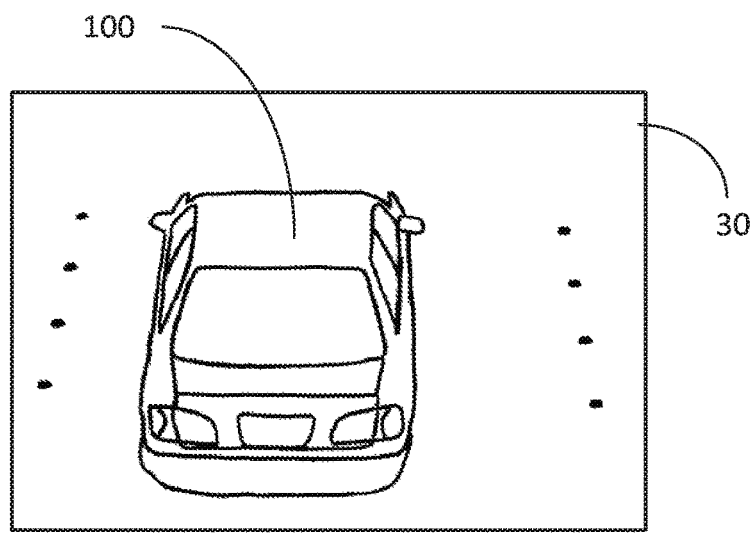
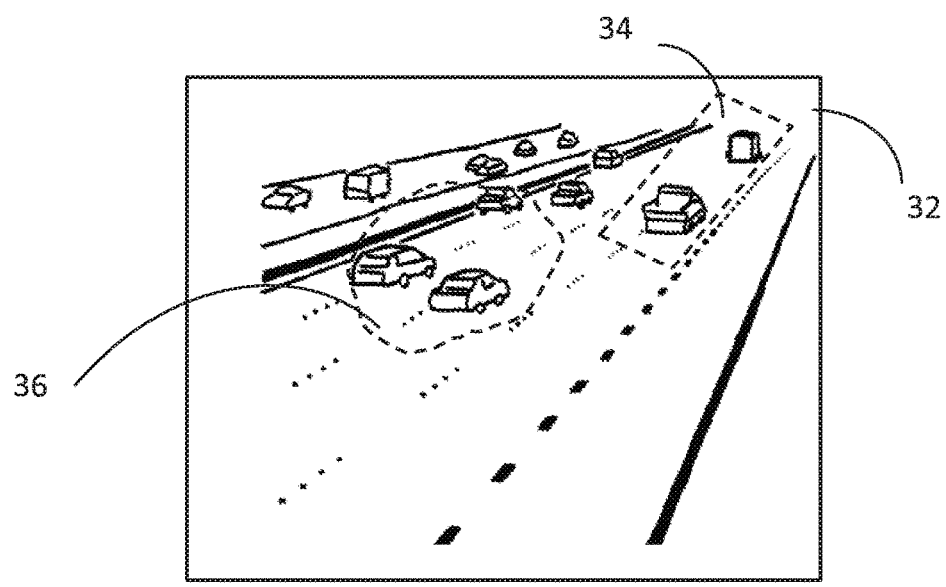

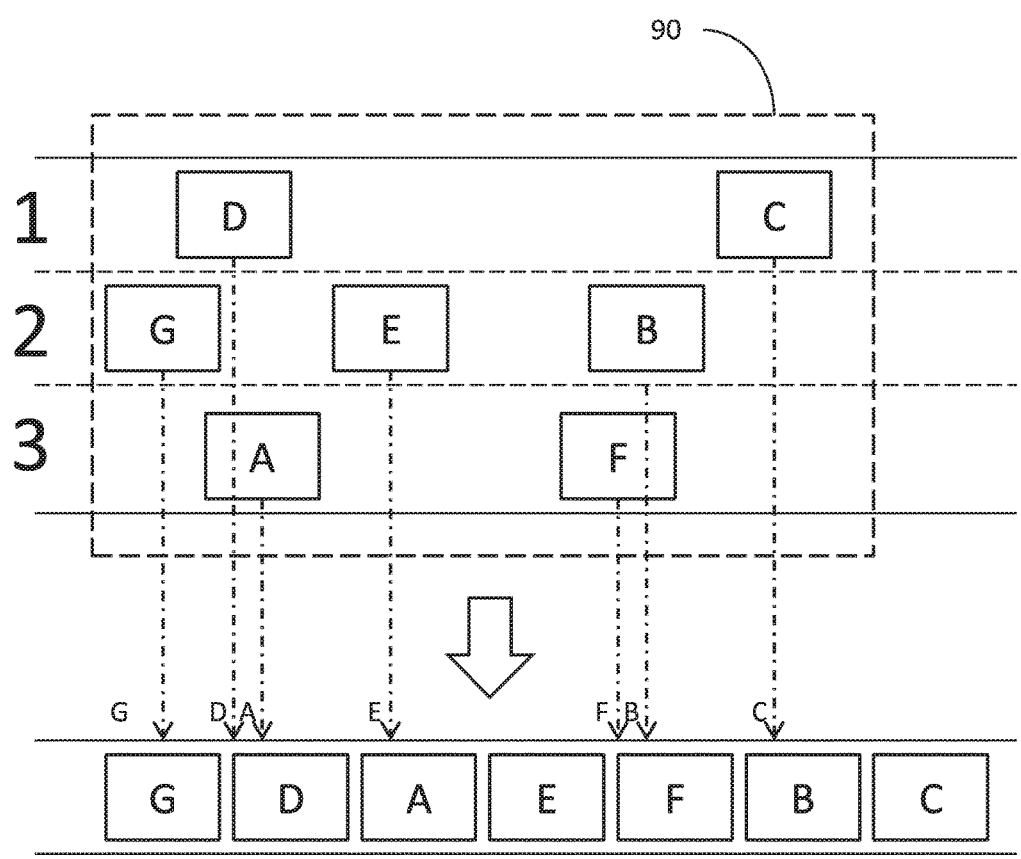

MULTI-CAMERA VEHICLE IDENTIFICATION SYSTEM

CROSS-REFERENCE TO RELATED APPLICATIONS

This is a Continuation of U.S. application Ser. No. 14/790,323 filed Jul. 2, 2015.

TECHNICAL FIELD

The presently disclosed subject matter relates generally to large scale video surveillance systems, and in particular, a multi-camera vehicle identification system.

BACKGROUND

Investigation of incidents is an important consideration in large scale video surveillance systems, such as those used by city authorities or law enforcement to monitor and investigate traffic incidents. These large scale surveillance systems often need to track objects across several different sensors, while understanding the connection between the tracked objects in the different sensors.

Various solutions to the problem of connecting tracked objects in different sensors have been proposed in the prior art. For example:

PCT Patent Publication No. WO2014/072971 describes determining a license plate number of a vehicle tracked by a surveillance system by monitoring a first area with a surveillance camera to detect entry of a vehicle into the first area and recording a detection time, and substantially simultaneously capturing with a LPR camera an image of a license plate of a vehicle entering the first area, and correlating the time of the detection with the time of the capture to associate the tracked vehicle with a license plate number.

U.S. Pat. No. 5,696,503 describes a traffic surveillance system having a plurality of sensor systems separated by a roadway link, each sensor system comprising a fingerprinting sensor and a traffic processor, the sensor providing raw signals including fingerprints of vehicles within a field, and the processor distinguishing individual vehicles based upon their respective fingerprints, reducing the fingerprints to characterizations of predefined attributes, and determining the position of each distinguished vehicle within the field.

U.S. Pat. No. 7,295,106 describes classifying objects in a monitored zone using multiple surveillance devices by receiving a set of objects within a predefined zone area from each of at least a first and second surveillance means. Subsequently, each received set of objects is filtered to ensure that the objects in the set are comparable to the objects in the other received set. Characteristics of the received sets of objects are compared and characteristics of the objects within a received set of objects are compared to characteristics of the objects within a different set of received objects, wherein the characteristics are based upon a set of predetermined characteristics. It is determined if each object or set identified by the first surveillance means corresponds to an object or set identified by the second surveillance means.

U.S. Patent Publication No. 2014/0098221 describes an approach for re-identifying, in a second test image, an object in a first test image by determining a brightness transfer functions (BTFs) between respective pairs of training images. Respective similarity measures are determined between the first test image and each of the training images captured by the first camera (first training images). A weighted brightness transfer function (WBTF) is determined by combining the BTFs weighted by weights of the first training images. The first test image is transformed by the WBTF to better match one of the training images captured by the second camera. Another test image, captured by the second camera, is identified because it is closer in appearance to the transformed test image than other test images captured by the second camera.

EP Patent No. 1,489,552 describes improved detection and recognition of objects such as vehicles by image processing a camera image of the vehicle by correcting sensor pixel values with a reflection component. The detected vehicle can be re-identified downstream by a second camera. The success rate of recognition can be improved by recognizing additional object consequences and/or platoons.

PCT Patent Publication No. WO2011/120194 describes measuring a journey time between nodes in a road network by detecting characteristics of a car sequence sequentially passing through the node network, wherein a first node reports characteristics of the car sequence to a neighbor node, and the neighbor node compares the characteristics of the car sequence reported by the first node with characteristics of the car sequence detected at the neighbor node to find a matching position, and calculates a journey time from the first node to the neighbor node.

Coifman, Benjamin (1999), "Vehicle Reidentification and Travel Measurements on Congested Freeways", California Partners for Advanced Transit and Highways (PATH), describes using loop detectors at an upstream and downstream location to measure vehicle lengths, and comparing vehicle platoons detected at the upstream and downstream locations to identify matching platoons based on the vehicle lengths of vehicles in the platoons, thereby enabling identification of a particular vehicle of particular length within the reidentified platoon.

C. C. Sun, R. P. Ramachandran and S. G. Ritchie "Vehicle reidentification using multidetector fusion", IEEE Trans. Intell. Transp. Syst., vol. 5, no. 3, pp. 155-164 2004, describes a multi-detector vehicle re-identification algorithm by selecting a platoon detected at a downstream site, generating a list of upstream candidate platoons subject to a time window constraint, and comparing each upstream platoon to the downstream platoon using feature vectors and a linear L1 (absolute distance) nearest neighbor classifier to determine a best matching platoon, whereupon individual vehicles are then reidentified.

The references cited below teach background information that may be applicable to the presently disclosed subject matter:

dos Santos, D. J. A. (2008). Automatic Vehicle Recognition System. Masters Dissertation, Universidade Tecnica de Lisboa. ("Santos")

Jang, D. M., & Turk, M. (2011). Car-Rec: A real time car recognition system. In applications of computer vision (WACV), 2011 IEEE Workshop on (pp. 599-605). IEEE. ("Jang")

Lim, T. R., & Guntoro, A. T. (2002). Car recognition using Gabor filter feature extraction. In Circuits and Systems, 2002. APCCAS'02. 2002 Asia-Pacific Conference on (Vol. 2, pp. 451-455). IEEE. ("Lim")

Dorkó, G., & Schmid, C. (2003). Selection of scale-invariant parts for object class recognition. In Computer Vision, 2003. Proceedings. Ninth IEEE International Conference on (pp. 634-639). IEEE. ("Schmid")

Swain, M. J., & Ballard, D. H. (1991). Color indexing. International journal of computer vision, 7(1), 11-32. ("Swain")

Caspi, Y., Simakov, D., & Irani, M. (2006). Feature-based sequence-to-sequence matching. International Journal of Computer Vision, 68(1), 53-64.

Barton, G. J. (1998). Protein sequence alignment techniques. Acta Crystallo-graphica Section D: Biological Crystallography, 54(6), 1139-1146.

Navarro, G. (2001). A guided tour to approximate string matching. ACM computing surveys (CSUR), 33(1), 31-88. http://doi.acm.org/10.1145/375360.375365

The full contents of the above publications are incorporated by reference herein in their entirety.

GENERAL DESCRIPTION

Two of the most common sensors for monitoring and tracking vehicles are license plate recognition (LPR) camera systems and standard video cameras. However, there presents a technical problem in mapping images between LPR systems and video cameras because LPR images and video images of the same scene can display very different visual properties. LPR cameras usually rely on infra-red light to capture video or still images, while "regular" video cameras are designed to focus on the visible spectrum. Therefore, a video image and an LPR image capturing the same object at the same time can visually represent the object differently.

Moreover, additional camera settings such as the image resolution, viewing angle or light exposure, present further challenges when establishing scene correspondences between such two cameras. Finding a correspondence between an object viewed from two different cameras based solely on its available visual representations presents a challenge for automated systems, such as object tracking systems.

In accordance with certain aspects of the presently disclosed subject matter, there is provided a method of identifying in one or more images captured by a second camera a target object captured by a first camera. The method is provided by a processor, and comprises storing in a memory operatively coupled to the processor a first set of trained classifiers and a second set of trained classifiers. The first set specifies values corresponding to a first plurality of attributes usable for identifying objects captured by the first camera, and the second set differs from the first set and specifies values corresponding to a second plurality of attributes usable for identifying objects captured by the $2^{nd}$ camera. The first set of trained classifiers and second set of trained classifiers are trained independently, and the first plurality of attributes and second plurality of attributes have at least one attribute in common The method further comprises using one or more images captured by the first camera for generating a reference platoon of n objects, the reference platoon comprising the target object and (n−1) other objects. The method further comprises generating a reference group by running the first set of trained classifiers over the reference platoon, the reference group being indicative of values of attributes specified by the first set of trained classifiers and characterizing the objects in the reference platoon. The method further comprises using one or more images captured by the second camera for generating a plurality of candidate platoons, each candidate platoon comprising n objects, wherein the one or more images are captured by the second camera in a time window corresponding to the time of capturing by the first camera the one or more images used for generating the reference platoon. The method further comprises generating a plurality of candidate groups, each candidate group obtained by running the second set of trained classifiers over a respective candidate platoon, each candidate group being indicative of values of attributes specified by the second set of trained classifiers and characterizing the objects in the corresponding candidate platoon. The method further comprises selecting a candidate platoon corresponding to a candidate group best matching the reference group, and identifying the target object in the selected candidate platoon in accordance with a position of the target object in the reference platoon.

In accordance with certain other aspects of the presently disclosed subject matter, there is provided a method of identifying in one or more images captured by a second camera a target platoon of n objects corresponding to a reference platoon of n objects generated using images captured by a first camera, the method provided by a processor and comprising storing in a memory operatively coupled to the processor a first set of trained classifiers and a second set of trained classifiers. The first set specifies values corresponding to a first plurality of attributes usable for identifying objects captured by the first camera, and the second set differs from the first set and specifies values corresponding to a second plurality of attributes usable for identifying objects captured by the second camera. The first set of trained classifiers and second set of trained classifiers are trained independently, and the first plurality of attributes and second plurality of attributes have at least one attribute in common The method further comprises generating a reference group by running the first set of trained classifiers over the reference platoon, the reference group being indicative of values of attributes specified by the first set of trained classifiers and characterizing the objects in the reference platoon. The method further comprises using one or more images captured by the second camera for generating a plurality of candidate platoons, each candidate platoon comprising n objects, wherein the one or more images are captured by the second camera in a time window corresponding to the time of capturing by the first camera the one or more images used for generating the reference platoon. The method further comprises generating a plurality of candidate groups, each candidate group obtained by running the second set of trained classifiers over a respective candidate platoon, each candidate group being indicative of values of attributes specified by the second set of trained classifiers and characterizing the objects in the corresponding candidate platoon. The method further comprises selecting a candidate platoon corresponding to a candidate group best matching the reference group, and identifying the selected candidate platoon as the target platoon.

In accordance with further aspects of the presently disclosed subject matter, the $m^{th}$ object in the target platoon can be identified as the same object as the $m^{th}$ object in the reference platoon, m being less than or equal to n.

In accordance with certain other aspects of the presently disclosed subject matter, there is provided a system for identifying an object in a group of objects appearing in a plurality of cameras comprising a first camera, a second camera, a memory, and a processing unit communicatively coupled to the first camera, the second camera, and the memory. The processing unit comprises a processor configured to store in the memory a first set of trained classifiers and a second set of trained classifiers. The first set specifies values corresponding to a first plurality of attributes usable for identifying objects captured by the first camera, and the second set differs from the first set and specifies values corresponding to a second plurality of attributes usable for identifying objects captured by the second camera. The first set of trained classifiers and second set of trained classifiers are trained independently, and the first plurality of attributes and second plurality of attributes have at least one attribute in common The processor is further configured to generate, using one or more images captured by the first camera, a reference platoon of n objects, the reference platoon comprising the target object and (n−1) other objects. The processor is further configured to generate a reference group by running the first set of trained classifiers over the reference platoon, the reference group being indicative of values of attributes classified by the first set of trained classifiers and characterizing the objects in the reference platoon. The processor is further configured to generate, using one or more images captured by the second camera, a plurality of candidate platoons, each candidate platoon comprising n objects, wherein the one or more images are captured by the second camera in a time window corresponding to the time of capturing by the first camera the one or more images used for generating the reference platoon. The processor is further configured to generate a plurality of candidate groups, each candidate group obtained by running the second set of trained classifiers over a respective candidate platoon, each candidate group being indicative of values of attributes classified by the second set of trained classifiers and characterizing the objects in the corresponding candidate platoon. The processor is further configured to select a candidate platoon corresponding to a candidate group best matching the reference group, and to identify the target object in the selected candidate platoon in accordance with a position of the target object in the reference platoon.

In accordance with certain other aspects of the presently disclosed subject matter, there is provided a non-transitory storage medium comprising instructions that when executed by a processor, cause the processor to store in the memory a first set of trained classifiers and a second set of trained classifiers. The first set specifies values corresponding to a first plurality of attributes usable for identifying objects captured by the first camera, and the second set differs from the first set and specifies values corresponding to a second plurality of attributes usable for identifying objects captured by the second camera. The first set of trained classifiers and second set of trained classifiers are trained independently, and the first plurality of attributes and second plurality of attributes have at least one attribute in common The instructions further cause the processor to generate, using one or more images captured by the first camera, a reference platoon of n objects, the reference platoon comprising the target object and (n−1) other objects. The instructions further cause the processor to generate a reference group by running the first set of trained classifiers over the reference platoon, the reference group being indicative of values of attributes classified by the first set of trained classifiers and characterizing the objects in the reference platoon. The instructions further cause the processor to generate, using one or more images captured by the second camera, a plurality of candidate platoons, each candidate platoon comprising n objects, wherein the one or more images are captured by the second camera in a time window corresponding to the time of capturing by the first camera the one or more images used for generating the reference platoon. The instructions further cause the processor to generate a plurality of candidate groups, each candidate group obtained by running the second set of trained classifiers over a respective candidate platoon, each candidate group being indicative of values of attributes classified by the second set of trained classifiers and characterizing the objects in the corresponding candidate platoon. The instructions further cause the processor to select a candidate platoon corresponding to a candidate group best matching the reference group, and to identify the target object in the selected candidate platoon in accordance with a position of the target object in the reference platoon.

In accordance with further aspects and, optionally, in combination with other aspects of the presently disclosed subject matter, at least some of the objects can be vehicles, and at least one attribute can be selected from the group consisting of: attributes related to vehicle size, attributes related to vehicle color, attributes related to vehicle type, attributes related to vehicle shape, and attributes related to vehicle aspect ratio.

In accordance with further aspects and, optionally, in combination with other aspects of the presently disclosed subject matter, each classifier within a set of classifiers can be trained independently. The objects can be vehicles behind and/or in front of the target vehicle in the same lane as the target vehicle, and the value for n can be in the range of 3-9. One of the first or second cameras can be configured for license plate recognition.

In accordance with further aspects and, optionally, in combination with other aspects of the presently disclosed subject matter, the reference group can be a reference sequence, and the candidate groups can be candidate sequences.

In accordance with further aspects and, optionally, in combination with other aspects of the presently disclosed subject matter, each candidate sequence can be associated with a distance metric indicative of the sequence level distance between the given candidate sequence and the reference sequence, and the candidate sequence best matching the reference sequence can be the candidate sequence associated with the lowest distance metric. The sequence level distance can be equal to the sum of object level distances for each pair of corresponding objects in the candidate sequence-reference sequence pair, and an object level distance for a given pair of objects can be the sum of the attribute level distances for the given pair of objects.

In accordance with further aspects and, optionally, in combination with other aspects of the presently disclosed subject matter, each attribute can be associated with a given weight, and the sequence level distance can be equal to the weighted sum of the object level distances, and each object level distance can be equal to the weighted sum of the attribute level distances. The attribute weights can be learned by minimizing the error on object level distances for a given pair of matching sequences.

In accordance with further aspects and, optionally, in combination with other aspects of the presently disclosed subject matter, n can be selected from the group consisting of: a predetermined value determined according to the degree of similarity of the objects in proximity to the target object, a predetermined value determined according to the frequency of passing objects in proximity to the target object, and a configurable value selected by a user.

It should be noted that one benefit of having the two sets of classifiers (one for each type of camera) trained independently of each other is that if a new camera type is added to the system, it is sufficient to train the classifiers for the new camera type. There is no need to change or retrain the classifiers for an existing camera type.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3 is a non-limiting example of images captured by a first and second camera in accordance with certain embodiments of the presently disclosed subject matter.

FIG. 9B is an illustration of a merging approach for transforming a group of sequences into a single sequence.

DETAILED DESCRIPTION OF EMBODIMENTS

The principles and operation of a multi-camera vehicle identification system according to the presently disclosed subject matter may be better understood with reference to the drawings and the accompanying description.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "executing", "associating", "training", "obtaining", "determining", "generating", "identifying", "comparing", "storing", "selecting" or the like, refer to the action(s) and/or process(es) of a computer that manipulate and/or transform data into other data, said data represented as physical, such as electronic, quantities and/or said data representing the physical objects. The terms "computer" and "processor" should be expansively construed to cover any kind of electronic device with data processing capabilities including, by way of non-limiting example, the vehicle identification system disclosed in the present application.

It is to be understood that the term "non-transitory" is used herein to exclude transitory, propagating signals, but to include, otherwise, any volatile or non-volatile computer memory technology suitable to the presently disclosed subject matter.

The operations in accordance with the teachings herein can be performed by a computer specially constructed for the desired purposes or by a general-purpose computer specially configured for the desired purpose by a computer program stored in a computer readable storage medium.

The references cited in the background teach many principles of identifying vehicles in a multi-camera system that may be applicable to the presently disclosed subject matter. Therefore the full contents of these publications are incorporated by reference herein where appropriate for appropriate teachings of additional or alternative details, features and/or technical background.

Embodiments of the presently disclosed subject matter are not described with reference to any particular programming language. It will be appreciated that a variety of programming languages can be used to implement the teachings of the presently disclosed subject matter as described herein.

Figure 1:
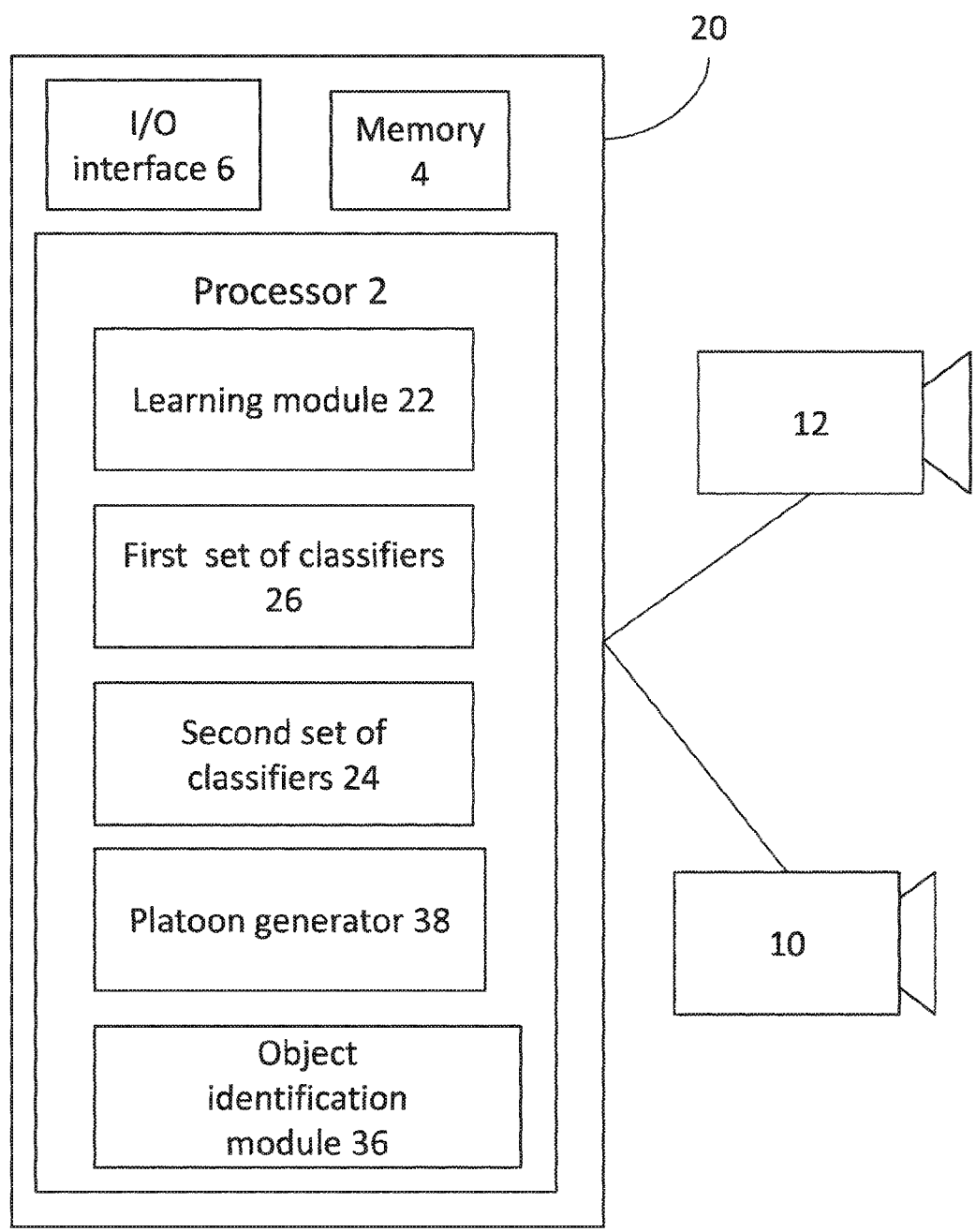
FIG. 1 is a functional block diagram of a multi-camera vehicle identification system in accordance with certain embodiments of the presently disclosed subject matter.

Bearing this in mind, attention is drawn to FIG. 1, where there is illustrated a generalized functional diagram of a multi-camera vehicle identification system (MVIDS). The MVIDS includes a first camera 10 and a second camera 12, communicatively coupled to a processing unit 20. In certain embodiments, first camera 10 and second camera 12 are different cameras. As used herein, the terms "different cameras" and "different camera systems" should be expansively construed to cover two or more cameras whose captured images depicting the same object are not directly comparable using standard image processing techniques due to differences in visual representation, including, without limitation, differences in angle, zoom level, illumination, color, resolution, sensor type (e.g. active sensors such as RADAR, LIDAR, etc. or passive sensors such as video cameras, infrared sensors, etc.), lens type (e.g. regular, fish eye, etc.), or otherwise (e.g. the cameras themselves can be of different camera types, or the cameras can be of the same type but set up differently so that, for example, one camera captures a frontal view of passing vehicles while the other camera captures a rear view of passing vehicles). In certain embodiments, first camera 10 is an LPR camera, and second camera 12 is a standard video camera. In certain embodiments, first camera 10 and second camera 12 capture images of vehicles driving in a specific lane ("single-lane embodiment"). In certain other embodiments, first camera 10 and second camera 12 capture images of vehicles driving in more than one lane ("multi-lane embodiment"). In certain multi-lane embodiments, first camera 10 can include several cameras, each camera covering one or more lanes, and/or second camera 12 can include several cameras, each covering one or more lanes.

Processing unit 20 includes a memory 4 configured to store data and/or executable program instructions, an I/O interface 6 to enable a user to interact with the MVIDS, and a processor 2 configured to execute program instructions as further detailed with reference to FIGS. 2A-2B. Each of processor 2, memory 4, and I/O interface 6 are communicatively coupled to one another. The term "communicatively coupled" should be understood to include all suitable forms of wired and/or wireless data connections which enable the transfer of data between connected devices.

In certain embodiments, memory 4 is non-volatile memory. In certain embodiments, I/O interface 6 is connectable to at least one output device such as a display (not shown), and at least one input device such as a keyboard (not shown).

In certain embodiments, processor 2 includes such functional modules as a learning module 22, a first set of classifiers 26, a second set of classifiers 24, a platoon generator 38, and an object identification module 36.

In certain embodiments, learning module 22 is configured to separately train each of the first set of classifiers 26 and the second set of classifiers 24 to classify a set of vehicle attributes as will be further detailed with reference to FIG. 2A.

Platoon generator 38 is configured to receive one or more images of vehicles, and generate a sequence of vehicles ("platoon"), as will be further detailed below with reference to FIGS. 2A-2B.

Object identification module 36 is configured to identify matching vehicle platoons, and identify a target vehicle within a matched platoon, as will be further detailed below with reference to FIGS. 2A-2B.

It is noted that the teachings of the presently disclosed subject matter are not bound by the specific MVIDS system described with reference to FIG. 1. Equivalent and/or modified functionality can be consolidated or divided in another manner and can be implemented in any appropriate combination of software, firmware and hardware. The processing unit can be implemented as a suitably programmed computer. The functions of the processing unit can be, at least partially, integrated with the first camera and/or the second camera.

Figure 2A:
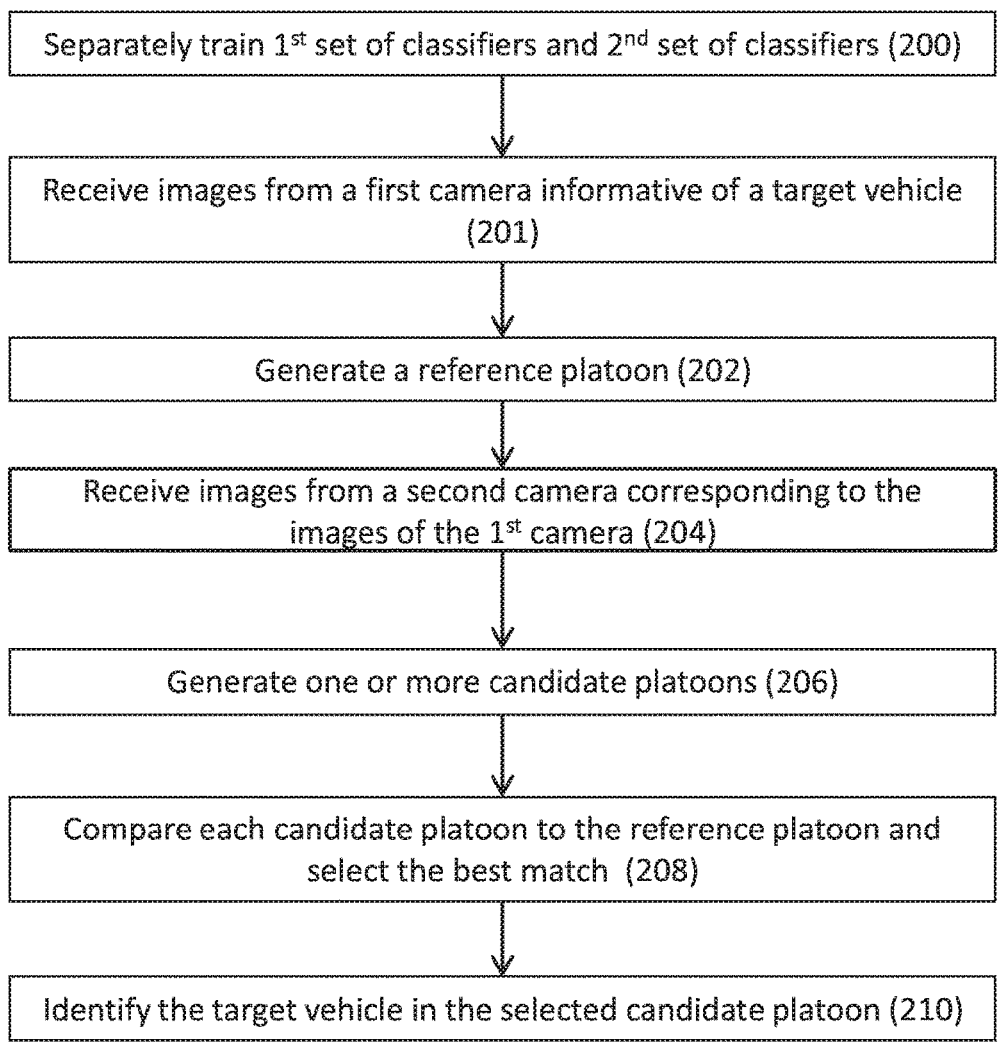
FIG. 2A is a generalized flow chart of identifying a vehicle in a multi-camera system in accordance with certain embodiments of the presently disclosed subject matter.

Referring now to FIG. 2A, there is illustrated a generalized flow chart of identifying a vehicle in a multi-camera vehicle identification system.

Processing unit 20 independently trains (200) each of the first set of classifiers 26 and the second set of classifiers 24. As used herein, a "classifier" should be expansively construed to cover a computer program that is programmed to assign one of a plurality of values to a specific attribute for describing an object depicted in an image. An attribute is assigned a value based on a learned relationship between one or more image features and the given attribute. As used herein, a "set of classifiers" should be expansively construed to cover a plurality of classifiers, each classifier for classifying a single specific attribute or combination thereof. As used herein, the terms "vehicle attributes" and "attributes" mean high level generic vehicle properties common to all vehicles including, without limitation, size, type, shape, color, aspect ratio, and the like. The background art identified above details numerous examples of image features that can be extracted from vehicle images and used to classify vehicle attributes. See, for example, Santos (entire document), Jang (entire document), Lim (entire document), Schmid (entire document), and Swain (entire document).

Using training images of vehicles captured by first camera 10 (or another camera of the same type as first camera 10), first set of classifiers 26 is trained to "learn" the relationship between specific image features present in the training images and vehicle attributes associated with the vehicles shown in the images (which are known in advance for the training images). Likewise, using training images of vehicles captured by second camera 12 (or another camera of the same type), second classifier 24 is trained to "learn" the relationship between specific image features present in the training images and vehicle attributes associated with the vehicles shown in the images.

It should be noted that the first set of classifiers and second set of classifiers are trained independently. That is, the first set of classifiers are trained using a first set of training images while the second set of classifiers are trained using a second set of training images different from the first set. The training (and operation) of the first set of classifiers does not depend on the training of the second set of classifiers and vice versa.

In certain embodiments, the individual classifiers within each set can be trained independently of any other classifier in the set of classifiers. One reason for doing so is to make the training process simpler. For example, when adding a classifier for a new attribute, the training can be done separately and independently (possibly on a new training set) without the need to change any of the existing classifiers. In certain other embodiments, the classifiers within a set of classifiers can be trained jointly. Jointly training the classifiers can lead to better classification performance. For example, when training two classifiers for two different attributes, a joint training on the same training set will allow for an improved feature selection step which allows for sharing of (some) features for related attributes but chooses different features for unrelated attributes. It should further be noted that the first set of classifiers and the second set of classifiers can be trained in any order, or simultaneously.

It should further be noted that not all of the attributes which are classified by the first set of classifiers need to be classified by the second set of classifiers, so long as at least one attribute is classified by both the first and second sets of classifiers. For example, if the first set of classifiers classifies attributes {A, B, C, D}, any of the following combinations (to list but a few) of attributes can be classified by the second set of classifiers: {A, C}, {D, E}, {B}. The training in 200 can be performed, e.g. using learning module 22. The first and second sets of trained classifiers can be stored in a memory.

Next, processing unit 20 receives (201) images and/or derivatives thereof from a first camera ("first camera images"). In certain embodiments, the received first camera images are stored in a memory, such as memory 4. For purposes of illustration only, the following description is provided for images received from the cameras. Those skilled in the art will readily appreciate that the disclosed subject matter is not limited to images, but includes any data representative of images such as derivatives of images and the like. At least one first camera image is informative of a target vehicle. In certain embodiments, the target vehicle can be designated as such by a user of the system, for example by entering input at I/O interface 6 designating a vehicle depicted in an image as a target vehicle. In certain other embodiments, the system can automatically designate the target vehicle as such upon a certain criterion being met. For example, if a license plate number of a vehicle captured by a first camera is automatically recognized (using LPR technology) as matching a license plate number on a "watch list", e.g. of vehicles reported stolen, the system can automatically designate the vehicle as a target vehicle.

In addition to at least one first camera image informative of the target vehicle, at least one or more first camera images depict other vehicles. In certain embodiments, the other vehicles can be vehicles in proximity to the target vehicle, and/or vehicles ahead of and/or behind the target vehicle (e.g. in the same lane) and/or vehicles in other lanes, such as vehicles in lanes parallel to the lane in which the target vehicle is travelling.

Next, processing unit 20 uses the first camera images to generate (202) a platoon of n vehicles including the target vehicle and n−1 other vehicles ("reference platoon"), e.g. using platoon generator 38. As used herein, a platoon is a sequence of vehicles. In certain embodiments, the sequence can be a one dimensional sequence (single-lane). In certain other embodiments, the sequence can be a multi-dimensional sequence (multi-lane). It will be appreciated that in a single lane embodiment, a vehicle platoon spans a single lane, while in a multi-lane embodiment a vehicle platoon can span one or more lanes. Referring now to FIG. 3, there is illustrated a non-limited example of a single lane platoon 34, and a multi lane platoon 36. In certain embodiments, n is configurable by a user. In certain other embodiments, n is determined by the system. Suitable values for n depend on how frequently identical or highly similar objects appear in the cameras. For example, if one possible reference platoon of size n=3 contains three identical taxis, then n should at least be larger than three (assuming the next vehicle is not another identical taxi) in order to correctly match platoons and identify the target vehicle. On the other hand, a lower value for n may be acceptable if the passing objects are highly distinct. Additional considerations for choosing the value for n are the frequency in which objects pass the area covered by the cameras. For example, if the area covered by the cameras is travelled very infrequently, a lower value n should be chosen. Otherwise, there may be an undesired delay in generating a reference platoon while the system "waits" for additional objects. In certain embodiments, an initial default value for n can be selected, and thereafter the system can automatically reduce (or increase) the value for n based on the current circumstances, such as the frequency and similarity of passing vehicles in proximity to the target vehicle. By way of non-limiting example, reasonable values for n can range from 3 to 9 with a reasonable default value of 5 or 7.

Processing unit 20 also receives (204) images captured by the second camera ("second camera images"). In certain embodiments, the second camera images are stored in a memory, such as memory 4. The second camera images are captured during a time window corresponding to the time of capture of the first camera images. "Corresponding to the time of capture of the first camera images" should be expansively construed to mean the same time, or a subsequent time which is related to the first time such that the images captured by the second camera are also informative of the target vehicle (although not yet identified as such), and of vehicles in proximity to the target vehicle. For example, if the first and second cameras are aimed at the same physical location (e.g. a point on a roadway), the second camera images are captured in a time window substantially identical to the time of capture of the first camera images. If the second camera is aimed at a location downstream (e.g. a point further along the roadway) from the first camera, the time window is subsequent to the time of capture by the first camera and represents the time when the vehicles captured by the first camera are expected to appear in view of the second camera. The second camera can also be upstream from the first camera in which case the time window is prior to the capture of the vehicles by the first camera. It should be noted that the first and second camera images can be received by processing unit 20 in real-time, i.e. as each image is captured, or processing unit 20 can receive prerecorded images stored in a memory. It should be further noted that the first camera images and second camera images can be received in any order. In certain embodiments, the second camera images, once received, are stored in a memory.

Next, processing unit 20 uses the images captured by the second camera to generate (206) one or more candidate platoons of n vehicles in proximity to one another (e.g. using platoon generator 38). Processing unit 20 then compares (208) each candidate platoon with the reference platoon and selects the candidate platoon which best matches the reference platoon, as will be further detailed below with reference to FIG. 2B.

Finally, processing unit 20 identifies (210) the target vehicle in the selected candidate platoon (also referred to as the "target platoon") based on the known position of the target vehicle in the reference platoon. That is, processing unit 20 identifies the $m^{th}$ object in the selected candidate platoon as the target vehicle, where m is the position ($1^{st}$, $2^{nd}$, $3^{rd}$, etc.) of the target vehicle in the reference platoon. Each of 208 and 210 can be performed, e.g. by object identification module 36.

Figure 2B:
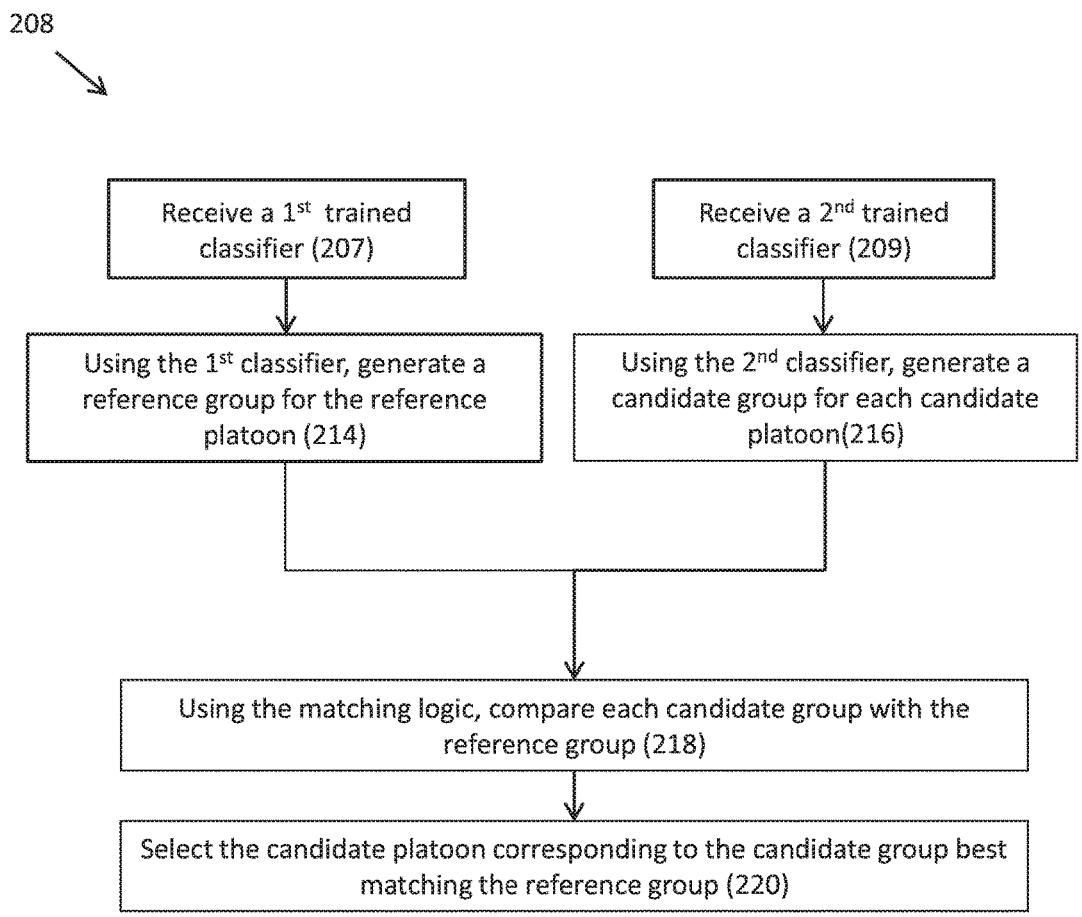
FIG. 2B is a generalized flow chart of selecting the best matching candidate platoon in accordance with certain embodiments of the presently disclosed subject matter.

Referring now to FIG. 2B, there is illustrated a method of comparing (208) candidate platoons and selecting a best match in accordance with certain embodiments. In certain embodiments, processing unit 20 receives (207) a first trained classifier, for example from a memory. Processing unit 20 also receives (209) a second trained classifier, e.g. from a memory. It should be noted that 207 and 209 can also occur prior to 208.

Figure 9A:
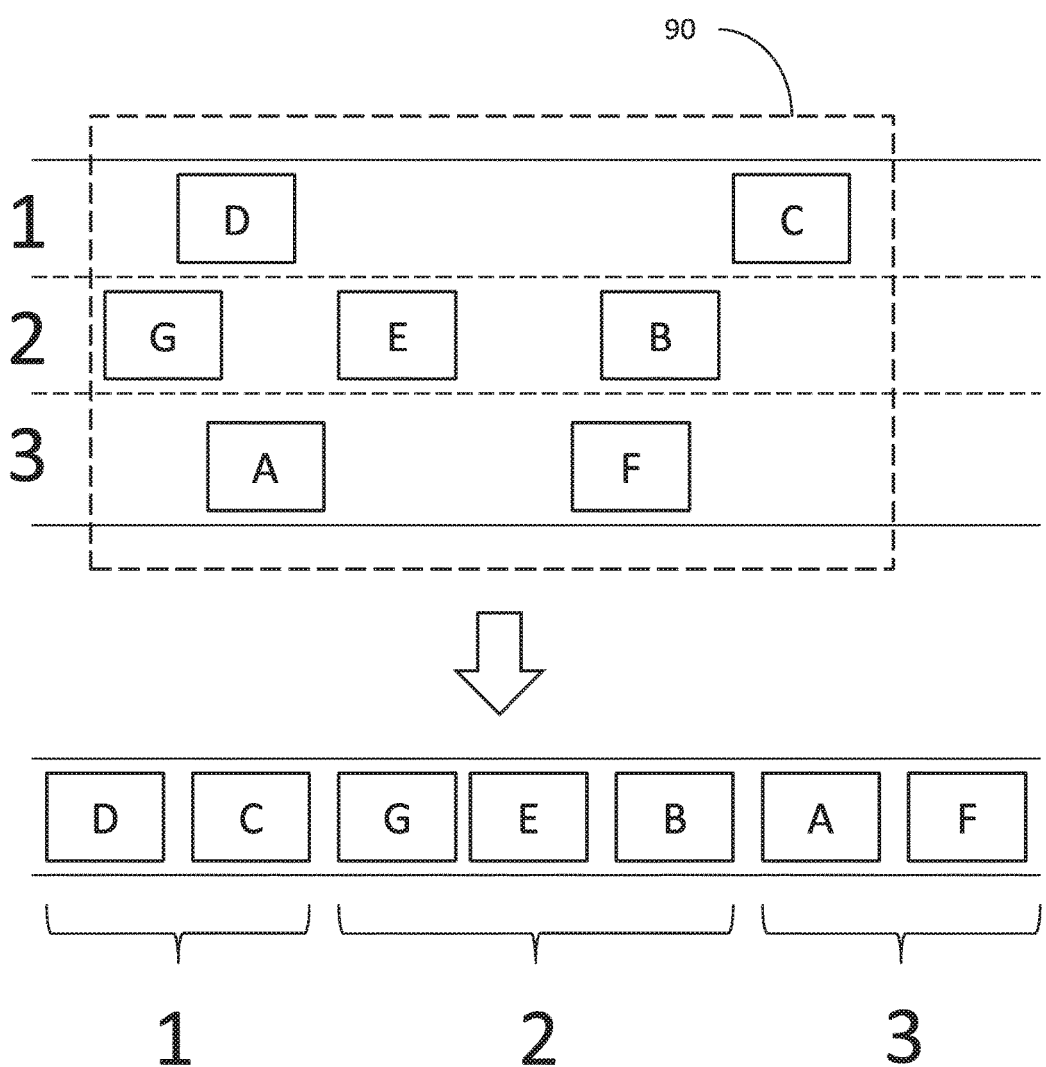
FIG. 9A is an illustration of a concatenation approach for transforming a group of sequences into a single sequence.

Next, processing unit 20 generates (214) a reference group of attributes and corresponding values characterizing the reference platoon by running the first set of trained classifiers over the reference platoon and classifying each vehicle in the reference platoon according to vehicle attributes. As used herein, the term "reference group" should be expansively construed to cover a group of n objects stored in a computer memory, where each object consists of a group of attributes and corresponding values, the reference group corresponding to a reference platoon. A reference group can take the form of a one-dimensional sequence, a plurality of one-dimensional sequences, a multi-dimensional sequence, or any other suitable formation in which the association between objects in the reference group and objects in the corresponding reference platoon is maintained. Referring now to FIGS. 9A-9B, there is illustrated a non-limiting illustration of a reference group 90.

Processing unit 20 also generates (216) a candidate group of attributes and corresponding values characterizing the candidate platoon by running the second set of classifiers over each candidate platoon, and classifying each vehicle in each respective candidate platoon. As used herein, the term "candidate group" should be expansively construed to cover a group of n objects stored in a computer memory, where each object consists of a group of attributes and corresponding values, the candidate group corresponding to a candidate platoon. A candidate group can take the form of a one-dimensional sequence, a plurality of one-dimensional sequences, a multi-dimensional sequence, or any other suitable formation in which the association between objects in the candidate group and objects in the corresponding candidate platoon is maintained. It should be noted that 216 can occur before, after, or in parallel with 214.

Next, processing unit 20 compares (218) each candidate group with the reference group. Finally, processing unit selects (220) the candidate platoon associated with the candidate group which "best matches" the reference group, as will be more fully detailed below.

For greater understanding of the subject matter detailed above, the following is a non-limiting example of identifying a target vehicle in a multi-camera system in a single-lane embodiment. Referring now to FIG. 3, there is illustrated a first image 30 captured by a LPR camera displaying a target vehicle 100, and a second image 32 captured at the same time and location by a standard video camera. One may want to identify the target vehicle in the second image 32, for example, in order to associate the vehicle in the video camera with the license plate number obtained from the LPR camera. However, because the images were captured by different cameras, as that term is defined above, the images are not directly machine comparable for the purpose of identifying target vehicle 100 in the second image 32.

Figure 4:
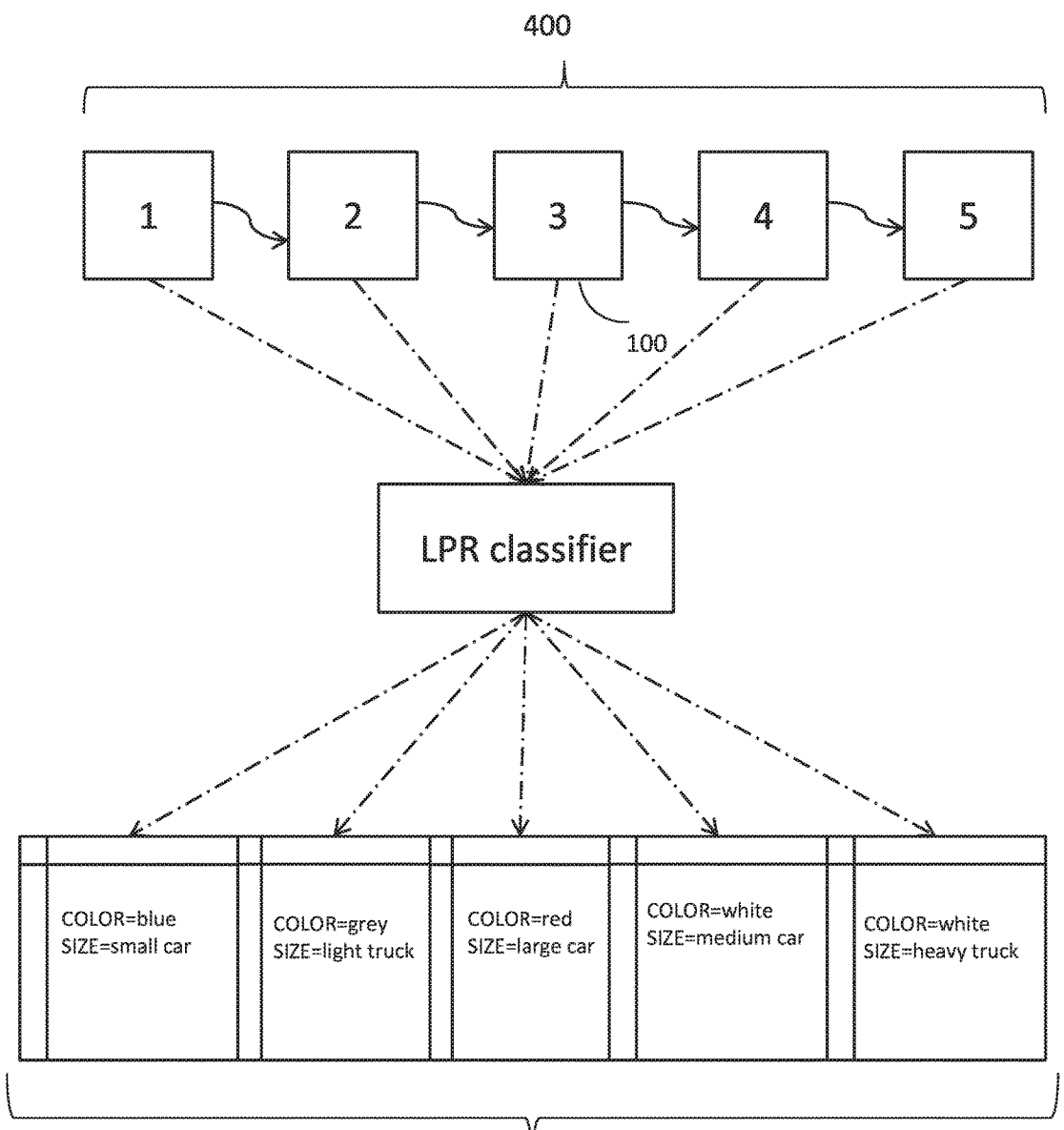
FIG. 4 is a conceptual illustration of a reference platoon and reference sequence in accordance with certain embodiments of the presently disclosed subject matter.

Referring now to FIG. 4, a reference platoon 400 consisting of five consecutive vehicles, in which target vehicle 100 is the $3^{rd}$ vehicle, is generated from images obtained from the LPR camera. Using a trained LPR classifier, the images of vehicles in the reference platoon are classified to obtain a reference sequence 401. In this example, the attributes classified are COLOR and SIZE.

Figure 5:
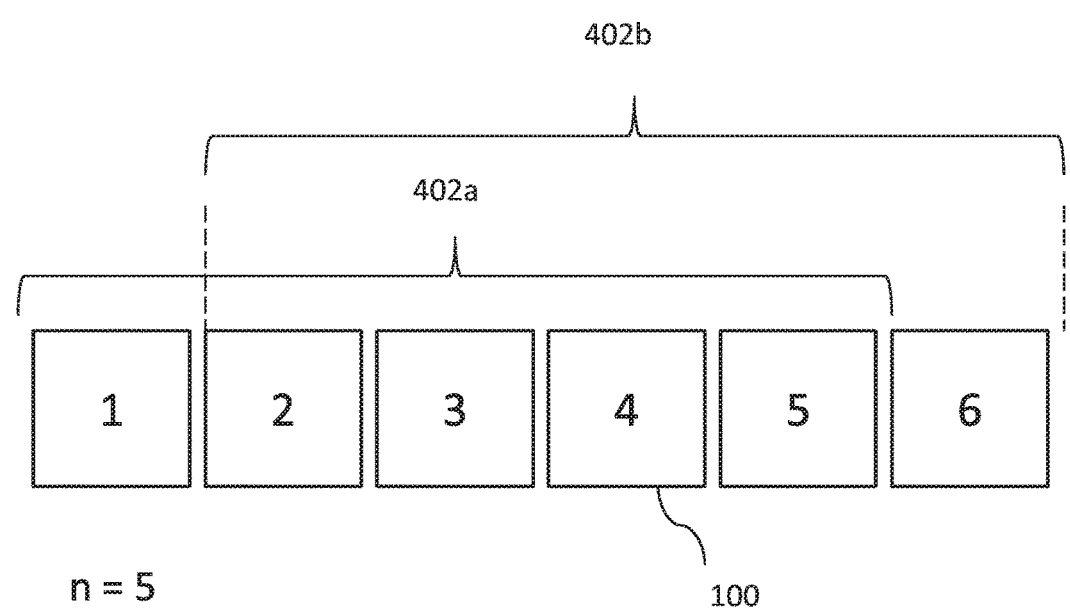
FIG. 5 is a conceptual illustration of candidate platoons in accordance with certain embodiments of the presently disclosed subject matter.

Referring now to FIG. 5, images captured by the video camera during a time window in which any of the reference platoon vehicles are expected to appear are identified, and candidate platoons 402a, 402b are generated, each of length n=5.

Figure 6:
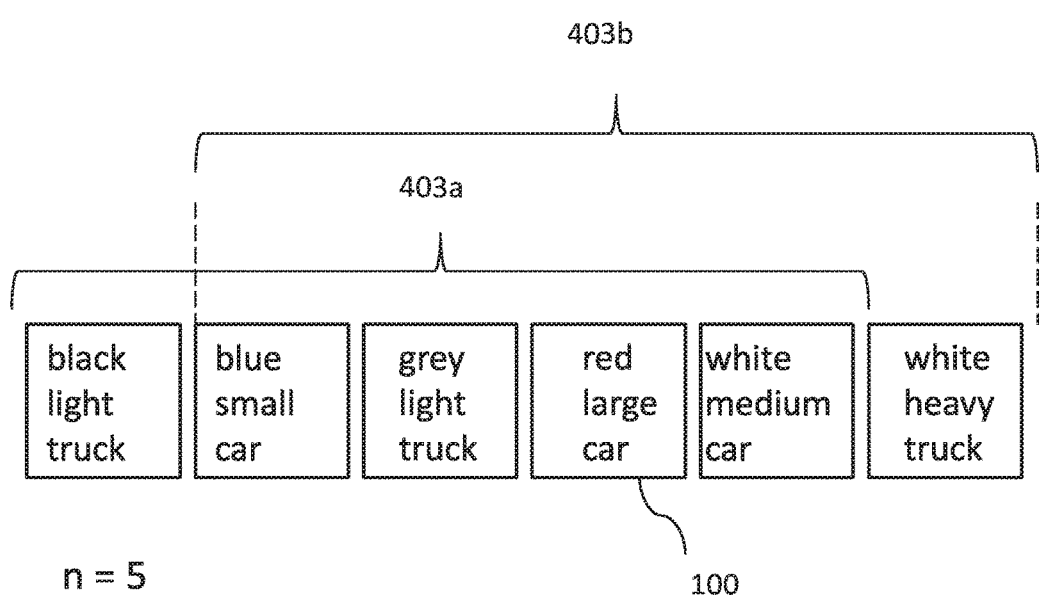
FIG. 6 is a conceptual illustration of candidate sequences in accordance with certain embodiments of the presently disclosed subject matter.

Referring now to FIG. 6, each image in candidate platoons 402a, 402b is provided to a trained video camera image classifier. The video camera image classifier also classifies the vehicles depicted in the images based on COLOR and SIZE to obtain candidate sequences 403a, 403b.

Figure 7:
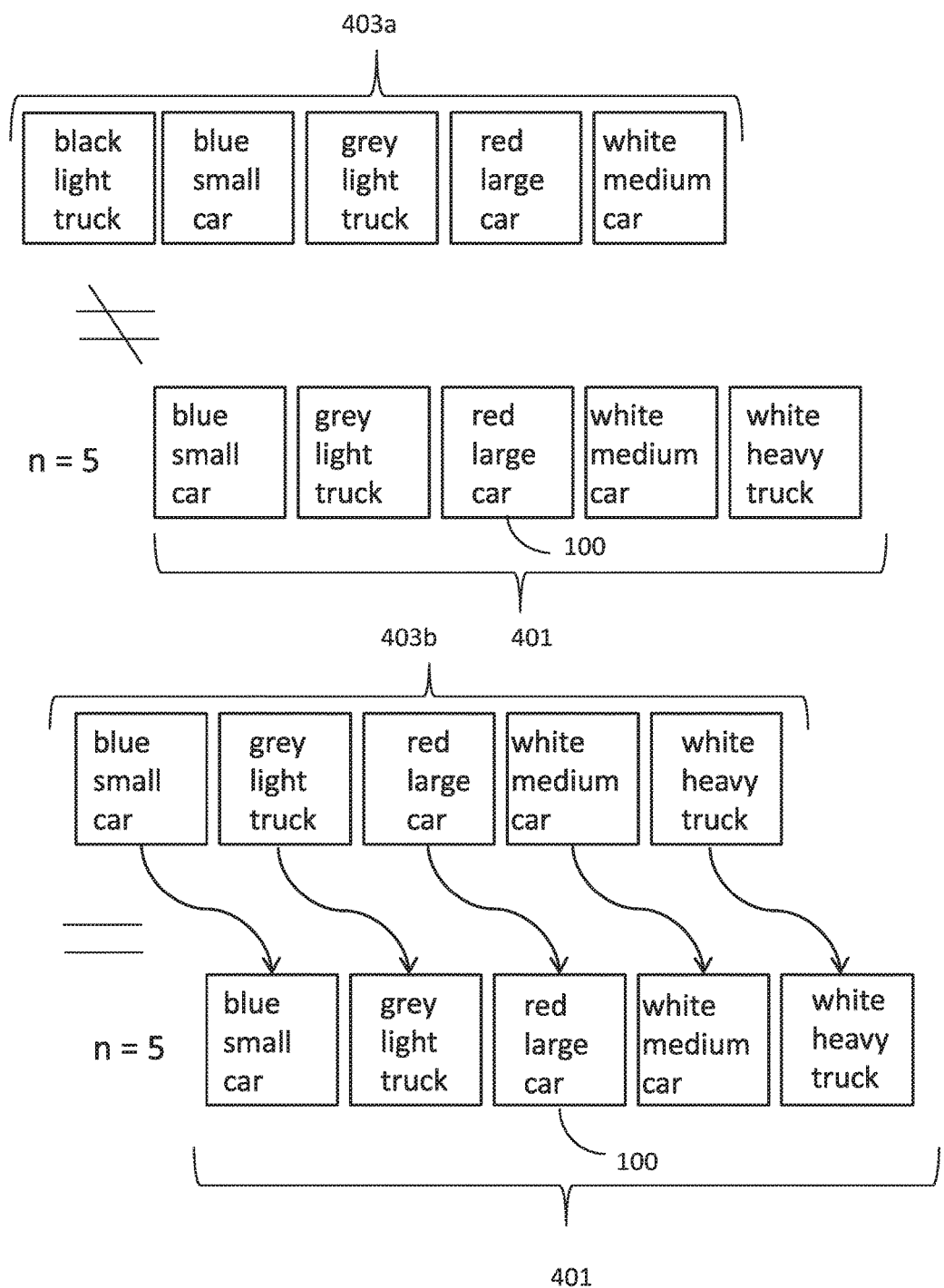
FIG. 7 is a conceptual illustration of comparing sequences in accordance with certain embodiments of the presently disclosed subject matter.

Referring now to FIG. 7, each of candidate sequences 403a, 403b is compared with reference sequence 401. Out of 10 pairs of attributes, candidate sequence 403a differs in 9 pairs (since the last vehicle in both sequences is white), therefore its distance is 9. On the other hand, candidate sequence 403b matches reference sequence 401 on all 10 pairs of attribute values, therefore its distance is 0. Candidate platoon 402b is therefore selected as the target platoon, and the target vehicle is identified as the $3^{rd}$ vehicle in the target platoon.

Non-limiting examples of methods of determining, in a single-lane embodiment, a candidate sequence which best matches a reference sequence will now be detailed. In certain embodiments, each candidate sequence is associated with a distance metric calculated as the sequence level distance between the candidate sequence and the reference sequence. In certain embodiments, the sequence level distance can be calculated as the sum of the object level distances for the given sequence pair, where an object level distance is the sum of the attribute level distances for the given object. For example, if the third object in the candidate sequence and the third object in the reference sequence differ by a single attribute, the object level distance for the third object is 1.

In certain embodiments, a normalized distance metric d or normalized similarity metric s can be obtained using methods well known in the art. For example, for histogram type features like color histograms or histograms of oriented gradients (a shape feature), the Bhattacharya distance can be used as a distance metric. For attributes of ordinal type, the Kendall tau distance can be used. For nominal attributes a distance metric can be established trivially by setting the distance d=0 for attribute values which are identical and d=1 otherwise. If a normalized similarity metric is obtained, it should first be converted into a normalized distance metric using the formula d=1−s.

In certain embodiments, individual attributes can be weighted, in which case the sequence level distance $d_{seq}$ is calculated as the weighted sum of the object level distances $d_{obj}$ with each object level distance being calculated as the weighted sum of the attribute level distances $d_{attr}$, where each attribute k has a weight w:

$$d_{seq} = \sum_i (w_i \cdot d_{obj}(i))$$

where $$d_{obj}(i, j) = \sum_k [w_k \cdot d_{attr}(attr_k(i), attr_k(j))]$$

and $$\sum_k w_k = 1$$

In certain embodiments, the weights $w_k$ can be learned using training images during an initial setup phase prior to operation. For example, a first platoon can be defined using images captured by the first camera. A second platoon, identical to the first platoon, can be defined using images captured by the second camera. A first sequence is derived from the first platoon using the first set of trained classifiers while a second sequence is derived from the second platoon using the second set of trained classifiers. The two sequences are compared, and the weights $w_k$ are learned by minimizing the error on the pairwise distance metric of corresponding objects in the two sequences using the formula:

$$\operatorname{argmin}_w \sum_{i,j} |\delta_{i,j} - d_{obj}(i, j)|$$

where $$\delta_{i,j} = \begin{cases} 0, \text{ if } i \text{ and } j \text{ are the same object,} \\ 1, \text{ otherwise} \end{cases}$$

Figure 8:
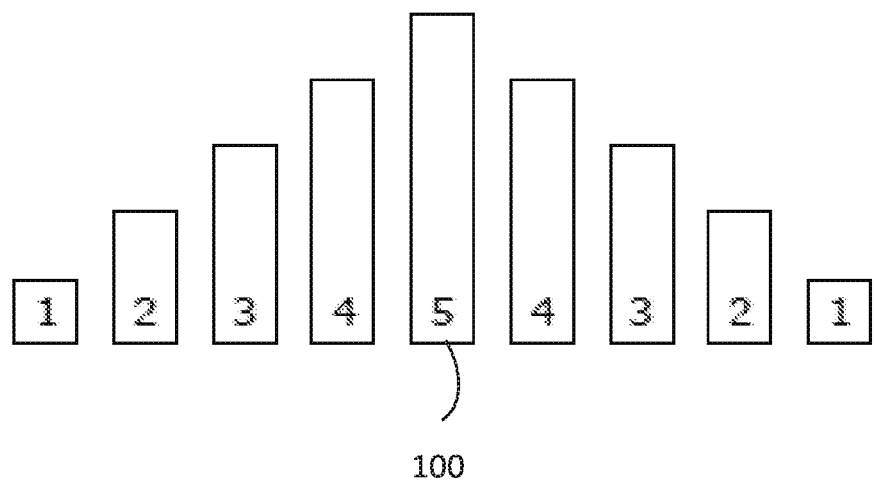
FIG. 8 is a conceptual illustration of relative weights in a sequence of nine objects in accordance with certain embodiments of the presently disclosed subject matter.

In certain embodiments, the weight factor is a predetermined value, which is highest for the target object and decays the further away an object in the sequence is from the target object i* according to the following formula:

$$w_i = \frac{\frac{n+1}{2} - |i - i^*|}{n^2 + 2n + 1}$$

where n is the number of objects in the sequence. Referring now to FIG. 8, there is shown a conceptual illustration of the relative weights in a sequence of nine objects, where target vehicle 100 is the center object. The absolute values for the weights are obtained by normalizing the relative weights, i.e. by dividing each value by the sum of the relative weights.

Non-limiting examples of methods of determining, in a multi-lane embodiment, a candidate group which best matches a reference group will now be detailed. The following examples assume that information about vehicles in multiple lanes is present (e.g. either through calibrated cameras observing individual lanes or parts of the whole street or a single camera overlooking all lanes covering a street in a certain area). As a first step, the reference group can be transformed into a reference sequence according to predefined criteria. Each candidate group is also transformed into a candidate sequence according to the same predefined criteria. Thereafter, each candidate sequence can be compared to the reference sequence and a best match determined according to the methods detailed above. For example, a reference group consisting of three parallel sequences corresponding to three lanes of a multi-lane highway can be re-arranged to form one sequence either by concatenating three sequences to form one, as illustrated in FIG. 9A, or merging the elements in each of the sequences into a single sequence, as illustrated in FIG. 9B.

It is to be understood that the presently disclosed subject matter is not limited in its application to the details set forth in the description contained herein or illustrated in the drawings. The presently disclosed subject matter is capable of other embodiments and of being practiced and carried out in various ways.

While the above description refers to vehicles, the presently disclosed subject matter is not limited only to identifying vehicles. It will be appreciated that any object in a sequence of objects in which each object is capable of being classified into high level generic attributes common to all objects of the same type can be identified using the methods and system detailed herein. For example, other types of objects that can be identified using the methods disclosed above include people walking along a sidewalk or through a corridor, luggage moving along on a conveyer belt, etc. In addition, the platoon of objects can, in certain non-limiting embodiments, consist of classifiable objects of varying types, for example a platoon can consist of vehicles and pedestrians.

In embodiments of the presently disclosed subject matter, fewer, more and/or different stages than those shown in FIGS. 2A-2B may be executed. In embodiments of the presently disclosed subject matter one or more stages illustrated in FIGS. 2A-2B may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 can be centralized in one location or dispersed over more than one location. In other embodiments of the presently disclosed subject matter, the system can comprise fewer, more, and/or different modules than those shown in FIG. 1.

It will also be understood that the system according to the invention may be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the presently disclosed subject matter as hereinbefore described without departing from its scope, defined in and by the appended claims.

The invention claimed is:

1. A method of identifying in an image captured by a second camera a target object captured by a first camera, the method implemented on a processor and comprising, by the processor:

using an image captured by the $1^{st}$ camera for generating a first set of n objects comprising the target object and (n−1) other objects;

classifying each object in the first set to generate a reference group of attribute values characterizing the n objects;

using an image captured by the $2^{nd}$ camera for generating a plurality of second sets of objects, each second set of objects comprising n objects;

classifying each object in each second set to generate, for each second set, a corresponding group of attribute values characterizing the objects in the corresponding second set;

selecting the second set of objects corresponding to the group of attribute values best matching the reference group of attribute values; and identifying the target object in the selected second set of objects in accordance with a position of the target object in the first set of objects.

2. The method of claim 1, wherein the image captured by the $2^{nd}$ camera is captured in a time window corresponding to the time of capturing by the $1^{st}$ camera the image used for generating the first set of objects.

3. The method of claim 2, wherein the first set of objects are classified using a first set of trained classifiers useable for identifying objects captured by the first camera and each second set of objects are classified using a second set of trained classifiers different from the first set of trained classifiers and useable for identifying objects captured by the second camera.

4. The method of claim 3, wherein the first set of trained classifiers and the second set of trained classifiers are stored in a non-transitory computer readable memory operatively coupled to the processor.

5. The method of claim 4, wherein the objects are vehicles and the sets of objects are platoons of vehicles.

6. The method of claim 5 wherein the vehicles are classified according to one or more attributes selected from the group consisting of: attributes related to vehicle size, attributes related to vehicle color, attributes related to vehicle type, attributes related to vehicle shape, and attributes related to vehicle aspect ratio.

7. A system for identifying an object in a group of objects appearing in a plurality of cameras comprising:

a non-transitory computer readable memory; and a processing unit communicatively coupled to the memory, the processing unit comprising a processor configured to:

generate, using an image captured by a $1^{st}$ camera and stored in the memory, a first set of n objects comprising the target object and (n−1) other objects;

classify each object in the first set to generate a reference group of attribute values characterizing the n objects;

generate, using an image captured by a $2^{nd}$ camera and stored in the memory, a plurality of second sets of objects, each second set of objects comprising n objects;

classify each object in each second set to generate, for each second set, a corresponding group of attribute values characterizing the objects in the corresponding second set;

select the second set of objects corresponding to the group of attribute values best matching the reference group of attribute values; and identify the target object in the selected second set of objects in accordance with a position of the target object in the first set of objects.

8. The system of claim 7, wherein the image captured by the $2^{nd}$ camera is captured in a time window corresponding to the time of capturing by the $1^{st}$ camera the image used for generating the first set of objects.

9. The system of claim 8, wherein the first set of objects are classified using a first set of trained classifiers useable for identifying objects captured by the first camera and each second set of objects are classified using a second set of trained classifiers different from the first set of trained classifiers and useable for identifying objects captured by the second camera.

10. The system of claim 9, wherein the first set of trained classifiers and the second set of trained classifiers are stored in the memory.

11. The system of claim 10, wherein the objects are vehicles and the sets of objects are platoons of vehicles.

12. The system of claim 11, wherein the vehicles are classified according to one or more attributes selected from the group consisting of: attributes related to vehicle size, attributes related to vehicle color, attributes related to vehicle type, attributes related to vehicle shape, and attributes related to vehicle aspect ratio.

13. A non-transitory storage medium comprising instructions that when executed by a processor, cause the processor to:
generate, using an image captured by a $1^{st}$ camera, a first set of n objects comprising the target object and (n−1) other objects;
classify each object in the first set to generate a reference group of attribute values characterizing the n objects;
generate, using an image captured by a $2^{nd}$ camera, a plurality of second sets of objects, each second set of objects comprising n objects;
classify each object in each second set to generate, for each second set, a corresponding group of attribute values characterizing the objects in the corresponding second set;
select the second set of objects corresponding to the group of attribute values best matching the reference group of attribute values; and
identify the target object in the selected second set of objects in accordance with a position of the target object in the first set of objects.

14. The medium of claim 13, wherein the image captured by the $2^{nd}$ camera is captured in a time window corresponding to the time of capturing by the $1^{st}$ camera the image used for generating the first set of objects.

15. The medium of claim 14, wherein the first set of objects are classified using a first set of trained classifiers useable for identifying objects captured by the first camera and each second set of objects are classified using a second set of trained classifiers different from the first set of trained classifiers and useable for identifying objects captured by the second camera.

16. The medium of claim 15, wherein the first set of trained classifiers and the second set of trained classifiers are stored in a non-transitory computer readable memory operatively coupled to the processor.

17. The medium of claim 16, wherein the objects are vehicles and the sets of objects are platoons of vehicles.

18. The medium of claim 17, wherein the vehicles are classified according to one or more attributes selected from the group consisting of: attributes related to vehicle size, attributes related to vehicle color, attributes related to vehicle type, attributes related to vehicle shape, and attributes related to vehicle aspect ratio.

* * * * *